United States Patent
Gottapu et al.

(10) Patent No.: US 9,362,819 B1
(45) Date of Patent: Jun. 7, 2016

(54) SINGLE CAPACITOR, CONTROLLED OUTPUT, INVERTER BASED POSITIVE/NEGATIVE CHARGE PUMP

(71) Applicant: FREESCALE SEMICONDUCTOR, INC., Austin, TX (US)

(72) Inventors: Anil Kumar Gottapu, Vizianagaram (IN); Mayank Jain, Ambala Cantt (IN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 0 days.

(21) Appl. No.: 14/835,570

(22) Filed: Aug. 25, 2015

(51) Int. Cl.
*G05F 1/10* (2006.01)
*G05F 3/02* (2006.01)
*H02M 3/07* (2006.01)

(52) U.S. Cl.
CPC .................................. *H02M 3/07* (2013.01)

(58) Field of Classification Search
CPC . H02M 3/073; H02M 3/07; H02M 2003/077; G11C 5/145; G05F 3/205

USPC .......................................................... 327/536
See application file for complete search history.

(56) References Cited

U.S. PATENT DOCUMENTS

| | | | |
|---|---|---|---|
| 5,397,928 A | 3/1995 | Chan | |
| 5,552,747 A | 9/1996 | Tomasini et al. | |
| 6,486,726 B1 | 11/2002 | Worley, Sr. et al. | |
| 7,427,882 B2 | 9/2008 | Henzler et al. | |
| 7,592,858 B1 * | 9/2009 | Jung | 327/536 |
| 2012/0032731 A1 * | 2/2012 | Huang et al. | 327/536 |

* cited by examiner

*Primary Examiner* — Quan Tra
(74) *Attorney, Agent, or Firm* — Charles E. Bergere

(57) ABSTRACT

A charge pump includes first through fifth transistors and a capacitor. The first through fourth transistors are connected in cascade and form a control circuit. The second transistor has a gate connected to its drain and hence, acts as a diode. The charge pump receives a clock signal and a supply voltage and generates an output voltage where the level of the output voltage is controlled by varying a size of the second transistor.

12 Claims, 3 Drawing Sheets

SINGLE CAPACITOR, CONTROLLED OUTPUT, INVERTER BASED POSITIVE/NEGATIVE CHARGE PUMP

BACKGROUND

The present invention relates generally to integrated circuits, and, more particularly, to a charge pump circuit.

Integrated circuits include analog and digital circuits such as phase-locked loops (PLLs), delay-locked loops (DLLs), analog-to-digital converters (ADCs), digital-to-analog converters (DACs), and memories, which require different supply voltages for performing various operations. Integrated circuits that receive a single power supply voltage often include a charge pump. The charge pump is a voltage converter that includes capacitors to store and transfer energy. The charge pump receives an input supply voltage and generates an output voltage that is different from the input supply voltage.

Traditionally, a charge pump includes at least two capacitors, which are generally very big to counter leakage and parasitics, that constitute most of the charge pump. Given a particular capacitor size, charge pump leakage determines the frequency at which it should be refreshed. The higher the leakage, the faster the charge pump output drops and needs to be refreshed. Further, as the circuit charge pumps the voltage, it generally must use higher rated devices than the devices already being used in the charge pump design. The traditional single capacitor charge pump has low output voltage control, which restricts the circuit to being operated in a certain common mode voltage range. This becomes a big restriction when trying to optimize the charge pump for lowest power and highest speed/resolution.

Referring to FIG. 1, a schematic circuit diagram of a conventional charge pump 100 is shown. The charge pump 100 includes a first complementary metal-oxide semiconductor (CMOS) inverter 102, a capacitor 104, a diode 106, and a second CMOS inverter 108.

The diode 106 has a first terminal connected to a voltage source (not shown) for receiving a supply voltage $V_{DD}$, and a second terminal connected to the CMOS inverter 102 and a first terminal of the capacitor 104. The capacitor 104 receives an input clock signal $V_{INPUT\_CLK}$ its second terminal.

The first CMOS inverter 102 includes a p-channel metal-oxide semiconductor (PMOS) transistor 110 and an n-channel metal-oxide semiconductor (NMOS) transistor 112. The PMOS transistor 110 has a gate terminal for receiving an inverted version of the input clock signal $V_{INV\_CLK}$ (hereinafter the "inverted input clock signal $V_{INV\_CLK}$"), and a source terminal connected to the second terminal of the diode 106. The NMOS transistor 112 has a gate terminal for receiving the inverted input clock signal $V_{INV\_CLK}$ and a source terminal connected to ground. The NMOS transistor 112 has a drain terminal connected to a drain terminal of the PMOS transistor 110 for generating an output voltage $V_{OUT}$.

The second CMOS inverter 108 receives the input clock signal $V_{INPUT\_CLK}$ and generates and provides the inverted input clock signal $V_{INV\_CLK}$ to the first CMOS inverter 102.

Initially, the input clock signal $V_{INPUT\_CLK}$ is low (i.e., logic low state), so the inverted input clock signal $V_{INV\_CLK}$ is high. The NMOS transistor 112 receives the inverted input clock signal $V_{INV\_CLK}$ at its gate terminal and hence, is turned ON, thereby providing the output voltage $V_{OUT}$ at a logic low state. Meanwhile, the capacitor 104 is charged to a first voltage level by current flowing through the diode 106. The first voltage level is approximately equal to the supply voltage $V_{DD}$.

When the input clock signal $V_{INPUT\_CLK}$ transitions from low to high, the first terminal of the capacitor 104 is raised to a second voltage level—the second voltage level is a sum of the first voltage level and a voltage level of the input clock signal $V_{INPUT\_CLK}$. The voltage level of the input clock signal $V_{INPUT\_CLK}$ when the input clock signal $V_{INPUT\_CLK}$ is high is approximately equal to $V_{DD}$. Thus, the second voltage level is approximately equal to $2*V_{DD}$. Hence, the second terminal of the diode 106 is at a higher voltage level than its first terminal, so the diode 106 is reverse biased. The NMOS transistor 112 receives the low inverted input clock signal $V_{INV\_CLK}$ at its gate so the NMOS transistor 112 is switched OFF. The source terminal of the PMOS transistor 110 is connected to the first terminal of the capacitor 104. Hence, the source terminal of the PMOS transistor 110 is at the second voltage level. As the gate terminal of the PMOS transistor 110 receives the inverted input clock signal $V_{INV\_CLK}$ at logic low state, the PMOS transistor 110 is switched ON, thereby providing the output voltage $V_{OUT}$ at the second voltage level. Thus, when the input clock signal $V_{INPUT\_CLK}$ is at low, the voltage level of the output voltage $V_{OUT}$ is approximately equal to zero and when the input clock signal $V_{INPUT\_CLK}$ is high, the voltage level of the output voltage $V_{OUT}$ is approximately equal to $2*V_{DD}$.

However, the charge pump 100 does not provide control over the voltage level of the output voltage $V_{OUT}$, i.e, the charge pump 100 does not provide the output voltage $V_{OUT}$ at a voltage level that is substantially greater than $V_{DD}$ and substantially less than $2*V_{DD}$. Thus, the charge pump 100 fails to provide the output voltage $V_{OUT}$ at a voltage level of $1.5*V_{DD}$. During charge pump operation, power dissipation in the charge pump 100 due to charge leakage through the diode 106 and the NMOS transistor 112 is high, which results in a high refresh rate of the capacitor 104. Further, the above technique cannot be modified to provide the output voltage $V_{OUT}$ at a voltage level less than ground, i.e., the charge pump 100 cannot be modified to operate as a negative charge pump.

It would be advantageous to have a charge pump that provides a controlled output voltage and has reduced power consumption.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION

Figure 1:
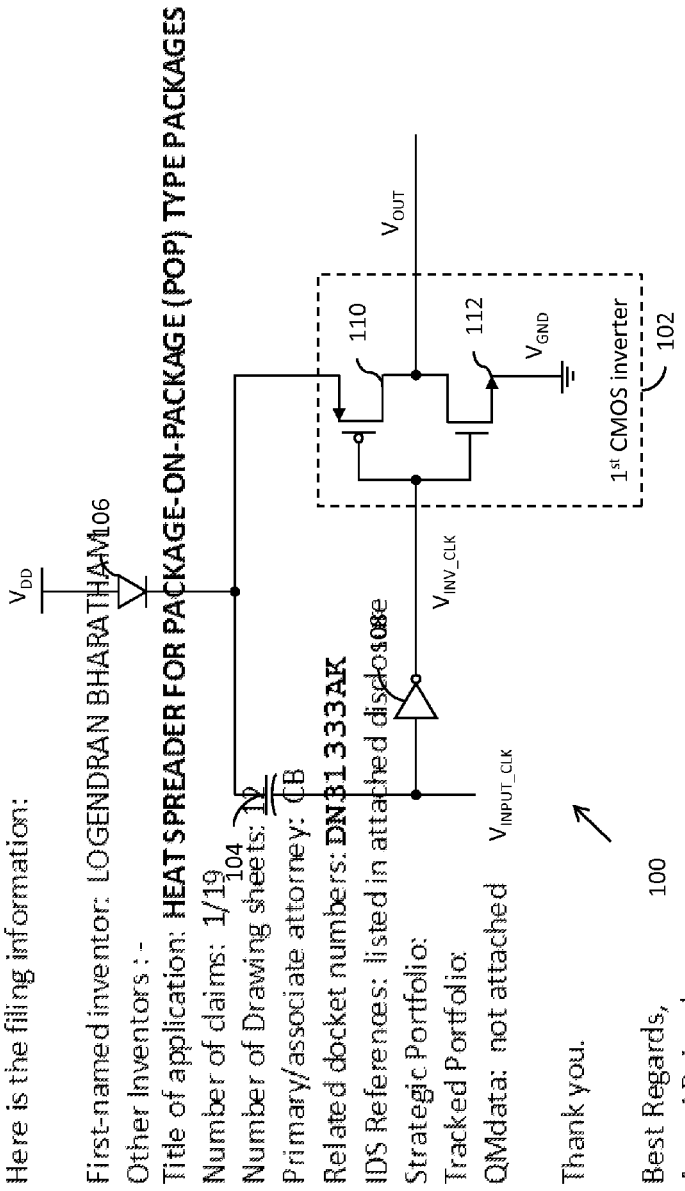
FIG. 1 is a schematic circuit diagram of a conventional charge pump.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a charge pump is provided. The charge pump includes a control circuit that includes first through fourth transistors. The control circuit receives a clock signal and an inverted version of the clock signal and generates a control signal and a first intermediate signal. The charge pump further includes a fifth transistor and a capacitor. The first transistor has a first terminal for receiving a supply voltage and a gate terminal for receiving the first intermediate signal. The second transistor has a gate terminal connected to a first terminal thereof and a second terminal connected to a second terminal of the first transistor for generating the control signal. The third transistor has a gate terminal for receiving the clock signal and a first terminal connected to the first terminal of the second transistor. The fourth transistor has a gate terminal for receiving the inverted version of the clock signal, a first terminal connected to ground, and a second terminal connected to a second terminal of the third transistor for generating the first intermediate signal. The fifth transistor has a gate terminal connected to the control circuit for receiving the control signal, a first terminal connected to the control circuit for receiving the first intermediate signal, and a second terminal for generating a second intermediate signal. The capacitor has a first terminal connected to the second terminal of the fifth transistor for receiving the second intermediate signal and a second terminal for receiving a delayed version of the clock signal. The capacitor generates an output voltage at the first terminal thereof.

In another embodiment of the present invention, a charge pump is provided. The charge pump includes a control circuit that includes first through fourth transistors. The control circuit receives a clock signal and an inverted version of the clock signal and generates a control signal and a first intermediate signal. The charge pump further includes a fifth transistor and a capacitor. The first transistor has a first terminal for receiving a supply voltage and a gate terminal for receiving the clock signal. The second transistor has a gate terminal for receiving the inverted version of the clock signal and a first terminal connected to a second terminal of the first transistor for generating the first intermediate signal. The third transistor has a gate terminal connected to a first terminal thereof and a second terminal of the second transistor. The fourth transistor has a gate terminal connected to a second terminal of the first transistor for receiving the first intermediate signal, a first terminal connected to ground, and a second terminal connected to a second terminal of the third transistor for generating the control signal. The fifth transistor has a first terminal connected to the control circuit for receiving the first intermediate signal, a gate terminal connected to the control circuit for receiving the control signal, and a second terminal for generating a second intermediate signal. The capacitor has a first terminal connected to the second terminal of the fifth transistor for receiving the second intermediate signal and a second terminal for receiving a delayed inverted version of the clock signal. The capacitor generates an output voltage at the first terminal thereof.

Various embodiments of the present invention provide a charge pump. The charge pump comprises first through fifth transistors and a capacitor. The first through fourth transistors form a control circuit and are connected in cascade. The second transistor has a gate terminal connected to a drain terminal thereof and hence, the second transistor functions as a diode. The charge pump receives a clock signal and a supply voltage and generates an output voltage.

A voltage level of the output voltage is controlled by varying a size of the second transistor. Hence, the charge pump provides a controlled output voltage, thereby improving efficiency of the charge pump. The above technique can be used to implement both a positive charge pump and a negative charge pump.

Figure 2:
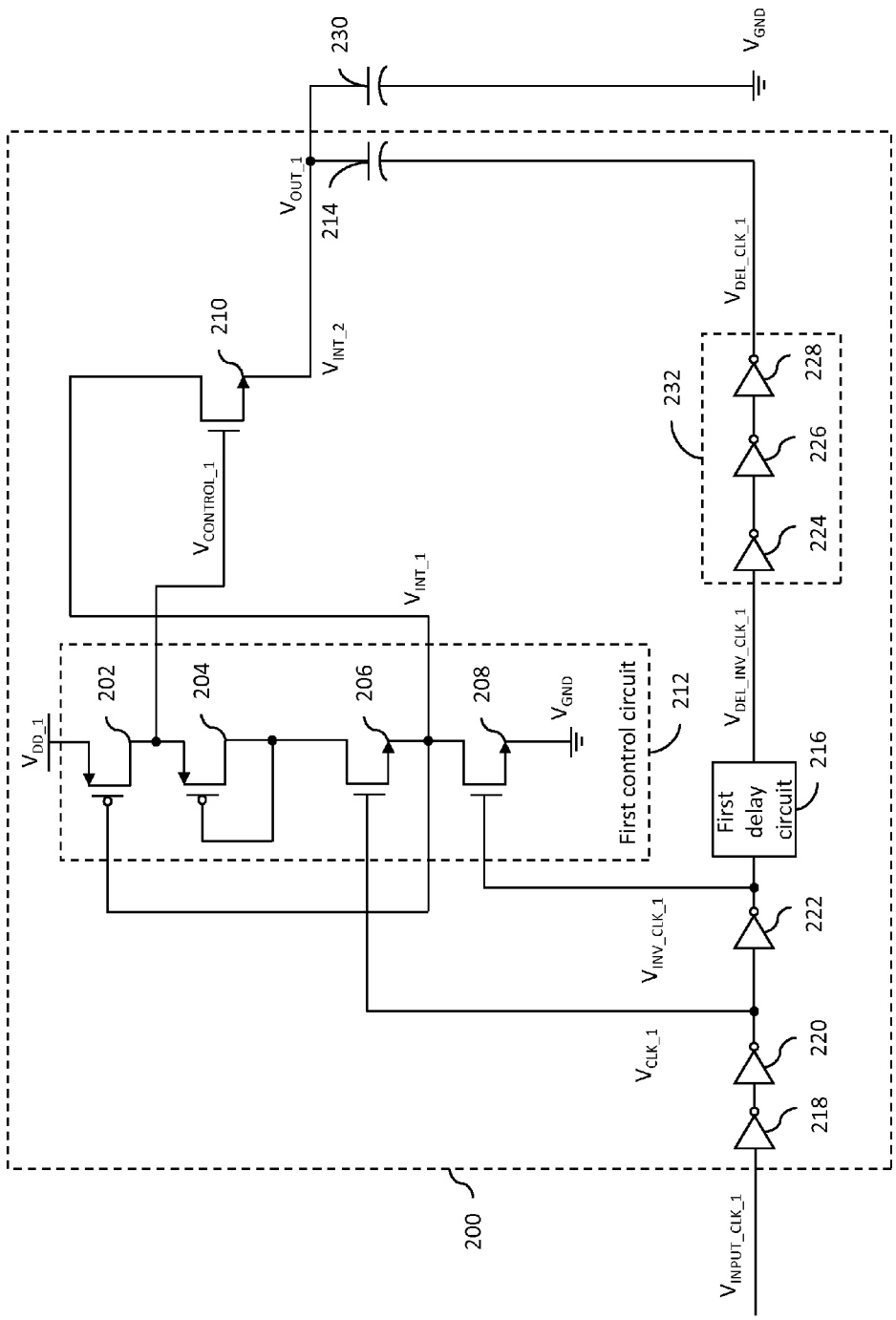
FIG. 2 is a schematic circuit diagram of a positive charge pump in accordance with an embodiment of the present invention.

Referring now to FIG. 2, a schematic circuit diagram of a first charge pump 200 in accordance with an embodiment of the present invention is shown. The first charge pump 200 is a positive charge pump. The first charge pump 200 includes first through fifth transistors 202-210. The first through fourth transistors 202-208 form a first control circuit 212. The first charge pump 200 further includes a first capacitor 214, a first delay circuit 216, and first through sixth inverters 218-228. The first charge pump 200 is connected to a first load capacitor 230. In one embodiment, the first and second transistors 202 and 204 are p-channel metal-oxide semiconductor (PMOS) transistors. The third through fifth transistors 206-210 are n-channel metal-oxide semiconductor (NMOS) transistors. The first through sixth inverters 218-228 are complementary metal-oxide semiconductor (CMOS) inverters.

The first inverter 218 and the second inverter 220 are connected in cascade for receiving a first input clock signal $V_{INPUT\_CLK\_1}$ and generating a first clock signal $V_{CLK\_1}$. The third inverter 222 is connected to the second inverter 220 for receiving the first clock signal $V_{CLK\_1}$ and generating an inverted version of the first clock signal $V_{INV\_CLK\_1}$ (hereinafter "inverted first clock signal $V_{INV\_CLK\_1}$").

The first delay circuit 216 is connected to the third inverter 222 for receiving the inverted first clock signal $V_{INV\_CLK\_1}$ and generating a delayed version of the inverted first clock signal $V_{DEL\_INV\_CLK\_1}$ (hereinafter referred to as "delayed inverted first clock signal $V_{DEL\_INV\_CLK\_1}$") after a first predetermined time period. The first delay circuit 216 includes multiple inverters (not shown). In one embodiment, the first delay circuit 216 is a skewed delay circuit, i.e., a falling time of the delayed inverted first clock signal $V_{DEL\_INV\_CLK\_1}$ is less than a rising time of the delayed inverted first clock signal $V_{DEL\_INV\_CLK\_1}$. The first predetermined time period can be varied by varying the number of inverters in the first delay circuit 216.

The fourth, fifth, and sixth inverters 224-228 are connected in cascade. The fourth, fifth, and sixth inverters 224-228 form a first set of inverters 232. The first set of inverters 232 is connected to the first delay circuit 216 for receiving the delayed inverted first clock signal $V_{DEL\_INV\_CLK\_1}$ and generating a delayed version of the first clock signal $V_{DEL\_CLK\_1}$ (hereinafter "delayed first clock signal $V_{DEL\_CLK\_1}$").

The first transistor 202 has a source terminal connected to a first voltage source (not shown) for receiving a first supply voltage $V_{DD\_1}$ and a gate terminal for receiving a first intermediate signal $V_{INT\_1}$. The second transistor 204 has a gate terminal connected to a drain terminal thereof and a source terminal connected to a drain terminal of the first transistor 202 for generating a first control signal $V_{CONTROL\_1}$. The third transistor 206 has a gate terminal connected to the second inverter 220 for receiving the first clock signal $V_{CLK\_1}$ and a drain terminal connected to the drain terminal of the second transistor 204. The fourth transistor 208 has a gate terminal connected to the third inverter 222 for receiving the inverted first clock signal $V_{INV\_CLK\_1}$, a source terminal connected to ground and a drain terminal connected to a source terminal of the third transistor 206 for generating the first intermediate signal $V_{INT\_1}$. The fifth transistor 210 has a gate terminal connected to the first control circuit 212 for receiving the first control signal $V_{CONTROL\_1}$ a drain terminal connected to the first control circuit 212 for receiving the first intermediate signal $V_{INT\_1}$, and a source terminal for generating a second intermediate signal $V_{INT\_2}$.

The first capacitor 214 has a first terminal connected to the source terminal of the fifth transistor 210 for receiving the second intermediate signal $V_{INT\_2}$ and a second terminal connected to the first set of inverters 232 for receiving the delayed first clock signal $V_{DEL\_CLK\_1}$. The first capacitor 214 generates a first output voltage $V_{OUT\_1}$ at the first terminal thereof.

The first load capacitor 230 has a first terminal connected to the first terminal of the first capacitor 214 for receiving the first output voltage $V_{OUT\_1}$ and a second terminal connected to ground.

Initially, the first input clock signal $V_{INPUT\_CLK\_1}$ is at a logic low state. Thus, the first clock signal $V_{CLK\_1}$ is at logic low state and the inverted first clock signal $V_{INV\_CLK\_1}$ is at logic high state. The third transistor 206 receives the first clock signal $V_{CLK\_1}$ at logic low state at the gate terminal thereof and hence, the third transistor 206 is switched OFF. The fourth transistor 208 receives the inverted first clock signal $V_{INV\_CLK\_1}$ at a logic high state at its gate terminal and hence is switched ON, thereby generating the first intermediate signal $V_{INT\_1}$ at logic low state. The first transistor 202 receives the first intermediate signal at logic low state at its gate terminal and hence is switched ON. The first transistor 202 generates the first control signal $V_{CONTROL\_1}$ at logic high state at its drain terminal. The fifth transistor 210 receives the first control signal $V_{CONTROL\_1}$ at logic high state at its gate terminal and receives the first intermediate signal at logic low state at its drain terminal. Therefore, the fifth transistor 210 is switched ON. The fifth transistor 210 generates the second intermediate signal $V_{INT\_1}$ at logic low state at its source terminal. The first capacitor 214 receives the second intermediate signal $V_{INT\_2}$ at logic low state at the first terminal thereof. Thus, the first terminal of the first capacitor 214 is charged to a voltage level corresponding to logic low state. Further, the delayed first clock signal $V_{DEL\_CLK\_1}$ is at logic low state. The first capacitor 214 receives the delayed first clock signal $V_{DEL\_CLK\_1}$ at logic low state at the second terminal thereof. Thus, the second terminal of the first capacitor 214 is charged to the voltage level corresponding to logic low state. Thus, the first capacitor 214 provides the first output voltage $V_{OUT\_1}$ at the voltage level corresponding to logic low state. In one embodiment, the voltage level corresponding to logic low state is 0 volts (V). Hence, when the first input clock signal $V_{INPUT\_CLK\_1}$ is at logic low state, the voltage level of the first output voltage $V_{OUT\_1}$ is 0V.

When the first input clock signal $V_{INPUT\_CLK\_1}$ transitions from low to high, the first clock signal $V_{CLK\_1}$ transitions from low to high and the inverted first clock signal $V_{INV\_CLK\_1}$ transitions from high to low. The third transistor 206 receives the first clock signal $V_{CLK\_1}$ at logic high state at its gate terminal and hence, the third transistor 206 is switched ON. Therefore, the third transistor 206 drives its terminal to a first voltage level, thereby driving the drain terminal of the fifth transistor 210 to the first voltage level. The fourth transistor 208 receives the inverted first clock signal $V_{INV\_CLK\_1}$ at logic low state at its gate terminal and hence, the fourth transistor 208 is switched OFF. This leads to a flow of current from the first voltage source to the drain terminal of the fifth transistor 210 by way of the first through third transistors 202-206. The fifth transistor 210 receives the first control signal $V_{CONTROL\_1}$ at logic high state at its gate terminal and hence, the fifth transistor 210 is switched ON.

Meanwhile, the first delay circuit 216 receives the inverted first clock signal $V_{INV\_CLK\_1}$ at logic low state and generates the delayed inverted first clock signal $V_{DEL\_INV\_CLK\_1}$ at logic low state after the first predetermined time period. Therefore, the first set of inverters 232 generates the delayed first clock signal $V_{DEL\_CLK\_1}$ at logic high state, thereby charging the second terminal of the first capacitor 214 to a second voltage level and hence, raising the voltage level of the first output voltage $V_{OUT\_1}$ to a third voltage level. The second voltage level is equal to a voltage level of the delayed first clock signal $V_{DEL\_CLK\_1}$. In one embodiment, the voltage level of the delayed first clock signal $V_{DEL\_CLK\_1}$ when the first input clock signal $V_{INPUT\_CLK\_1}$ is at logic high state is approximately equal to the first supply voltage $V_{DD\_1}$. Thus, the second voltage level is substantially equal to the first supply voltage $V_{DD\_1}$. In another embodiment, the third voltage level equals a sum of the second voltage level and the voltage level to which the first terminal of the first capacitor 214 is charged. As the voltage level of the first output voltage $V_{OUT\_1}$ is greater than a voltage at the gate terminal of the fifth transistor 210, the fifth transistor 210 is switched OFF.

Hence, the first charge pump 200 provides the first output voltage $V_{OUT\_1}$ at the third voltage level, which is greater than the voltage level of the first supply voltage $V_{DD\_1}$. Thus, the first charge pump 200 provides positive charge pump action. Further, current flowing from the first voltage source to the first terminal of the first capacitor 214 can be varied by varying a size of the second transistor 204. Thus, the voltage level to which the first terminal of the first capacitor 214 is charged before the second terminal of the first capacitor 214 is charged to $V_{DD\_1}$ is controllable by varying the size of the second transistor 204. Therefore, the first charge pump 200 allows a designer to adjust the voltage level of the first output voltage $V_{OUT\_1}$ by varying the size of the second transistor 204 when designing the first charge pump 200. In one embodiment, the voltage level of the first output voltage $V_{OUT\_1}$ increases upon reducing the size of the second transistor 204 and the voltage level of the first output voltage $V_{OUT\_1}$ decreases upon increasing the size of the second transistor 204.

As the first delay circuit 216 is a skewed circuit, the propagation time of the first input clock signal $V_{INPUT\_CLK\_1}$ to the second terminal of the first capacitor 214 when the first input clock signal $V_{INPUT\_CLK\_1}$ transitions from high to low is less than the propagation time of the first input clock signal $V_{INPUT\_CLK\_1}$ to the second terminal of the first capacitor 214 when the first input clock signal $V_{INPUT\_CLK\_1}$ transitions from low to high. Thus, the time required for the voltage level of the first output voltage $V_{OUT\_1}$ to drop to the voltage level corresponding to logic low state is less than the time required for the voltage level of the first output voltage $V_{OUT\_1}$ to rise to the third voltage level.

The first charge pump 200 can operate efficiently with a small size of the first capacitor 214, thereby reducing an area of the first charge pump 200. Further, charge leakage is less, thereby reducing a refresh rate of the first capacitor 214.

It will be understood by those of skill in the art that the voltage level of the first output voltage $V_{OUT\_1}$ can be controlled by varying a size of the third transistor 206 or the first transistor 202 or a combination thereof. It will be further understood by those of skill in the art that voltage level of the first output voltage $V_{OUT\_1}$ can be controlled by varying the number of inverters in at least one of the first delay circuit 216 and the first set of inverters 232. It will be further understood by those of skill in the art that the first charge pump 200 can function even without the first inverter 218, the second inverter 220, and the first set of inverters 232.

Figure 3:
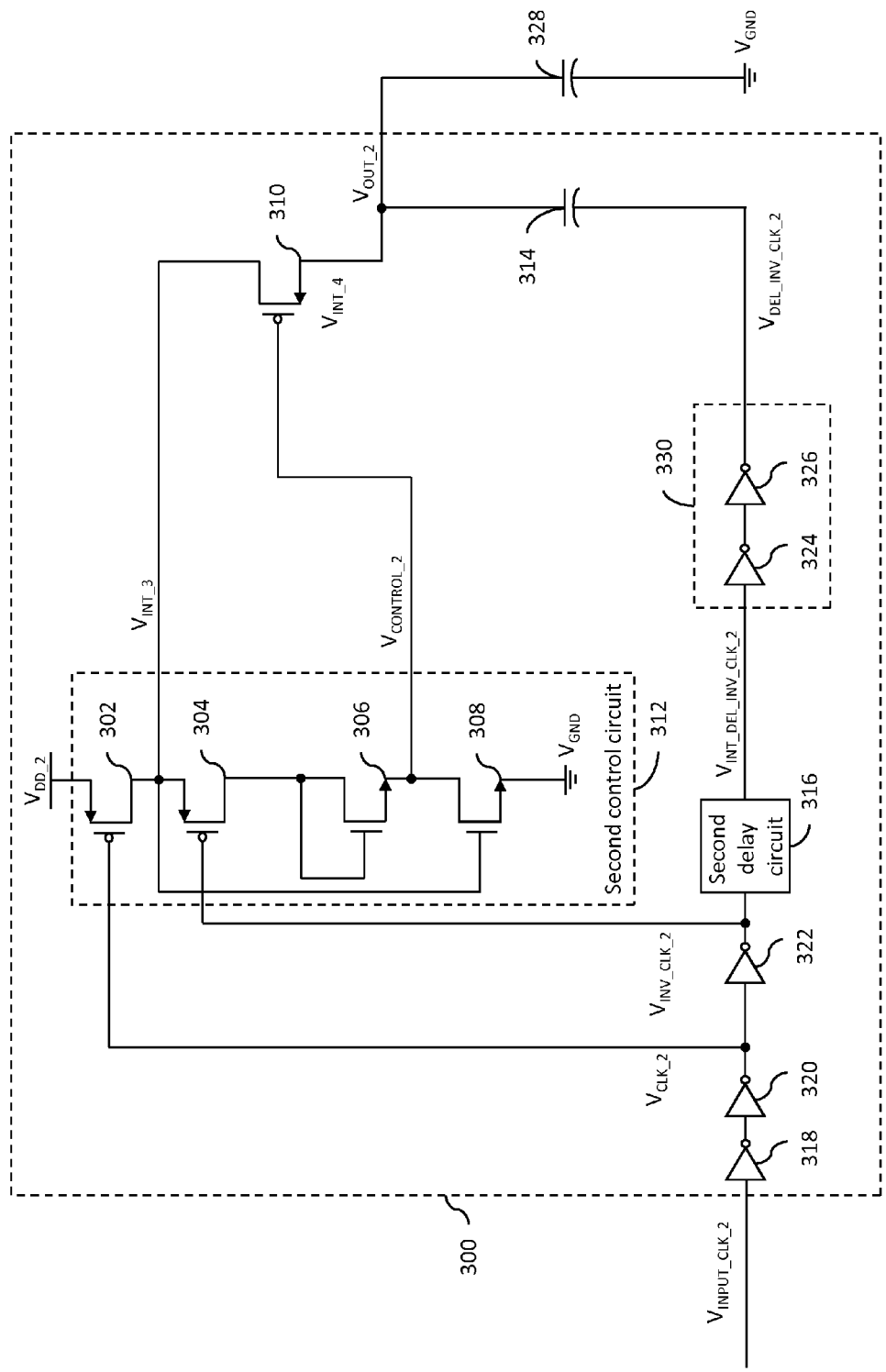
FIG. 3 is a schematic circuit diagram of a negative charge pump in accordance with an embodiment of the present invention.

Referring now to FIG. 3, a schematic circuit diagram of a second charge pump 300 in accordance with an embodiment of the present invention is shown. The second charge pump 300 is a negative charge pump. The second charge pump 300 includes sixth through tenth transistors 302-310. The sixth through ninth transistors 302-308 form a second control circuit 312. The second charge pump 300 further includes a second capacitor 314, a second delay circuit 316, and seventh through eleventh inverters 318-326. The second charge pump 300 is connected to a second load capacitor 328. In one embodiment, the sixth, seventh, and tenth transistors 302, 304 and 310 are PMOS transistors, the eighth and ninth transistors 306 and 308 are NMOS transistors, and the seventh through eleventh inverters 318-326 are CMOS inverters.

The seventh inverter 318 and the eighth inverter 320 are connected in cascade for receiving a second input clock signal $V_{INPUT\_CLK\_2}$ and generating a second clock signal $V_{CLK\_2}$. The ninth inverter 322 is connected to the second inverter 320 for receiving the second clock signal $V_{CLK\_2}$ and generating an inverted version of the second clock signal $V_{INV\_CLK\_2}$ (hereinafter "inverted second clock signal $V_{INV\_CLK\_2}$").

The second delay circuit 316 is connected to the ninth inverter 322 for receiving the inverted second clock signal $V_{INV\_CLK\_2}$ and generating an intermediate delayed version of the inverted second clock signal $V_{INT\_DEL\_INV\_CLK\_2}$ (hereinafter "intermediate delayed inverted second clock signal $V_{INT\_DEL\_INV\_CLK\_2}$") after a second predetermined time period. The second delay circuit 316 includes multiple inverters (not shown). In one embodiment, the second delay circuit 316 is a skewed delay circuit, i.e., a falling time of the intermediate delayed inverted second clock signal $V_{INT\_DEL\_INV\_CLK\_2}$ is less than a rising time of the intermediate delayed inverted second clock signal $V_{INT\_DEL\_INV\_CLK\_2}$. The second predetermined time period can be varied by varying the number of inverters in the second delay circuit 316.

The tenth and eleventh inverters 324 and 326 are connected in cascade. The tenth and eleventh inverters 324 and 326 form a second set of inverters 330. The second set of inverters 330 is connected to the second delay circuit 316 for receiving the intermediate delayed inverted second clock signal $V_{INT\_DEL\_INV\_CLK\_2}$ and generating a delayed inverted second clock signal $V_{DEL\_INV\_CLK\_2}$.

The sixth transistor 302 has a source terminal connected to a second voltage source (not shown) for receiving a second supply voltage $V_{DD\_2}$ and a gate terminal connected to the eighth inverter 320 for receiving the second clock signal $V_{CLK\_2}$. The seventh transistor 304 has a gate terminal connected to the ninth inverter 322 for receiving the inverted second clock signal $V_{INV\_CLK\_2}$ and a source terminal connected to a drain terminal of the sixth transistor 302 for generating a third intermediate signal $V_{INT\_3}$. The eighth transistor 306 has a gate terminal connected to its drain terminal and a drain terminal of the seventh transistor 304. The ninth transistor 308 has a gate terminal connected to the drain terminal of the sixth transistor 302 for receiving the third intermediate signal $V_{INT\_3}$, a source terminal connected to ground, and a drain terminal connected to a source germinal of the eighth transistor 306 for generating a second control signal $V_{CONTROL\_2}$. The tenth transistor 310 has a gate terminal connected to the second control circuit 312 for receiving the second control signal $V_{CONTROL\_2}$, a drain terminal connected to the second control circuit 312 for receiving the third intermediate signal $V_{INT\_3}$, and a source terminal for generating a fourth intermediate signal $V_{INT\_4}$.

The second capacitor 314 has a first terminal connected to the source terminal of the tenth transistor 310 for receiving the fourth intermediate signal $V_{INT\_4}$ and a second terminal connected to the second set of inverters 330 for receiving the delayed inverted second clock signal $V_{DEL\_INV\_CLK\_2}$. The second capacitor 314 generates a second output voltage $V_{OUT\_2}$ at the first terminal thereof.

The second load capacitor 328 has a first terminal connected to the first terminal of the second capacitor 314 for receiving the second output voltage $V_{OUT\_2}$ and a second terminal connected to ground.

Initially, the second input clock signal $V_{INPUT\_CLK\_2}$ is at a logic low state. Thus, the second clock signal $V_{CLK\_2}$ is at logic low state and the inverted second clock signal $V_{INV\_CLK\_2}$ is at logic high state. The sixth transistor 302 receives the second clock signal $V_{CLK\_2}$ at logic low state at the gate terminal thereof and hence, the sixth transistor 302 is switched ON. The sixth transistor 302 receives the second supply voltage $V_{DD\_2}$ at the source terminal thereof and generates the third intermediate signal $V_{INT\_3}$ at logic high state at its drain terminal. Thus, the tenth transistor 310 receives the third intermediate signal $V_{INT\_3}$ at logic high state at the drain terminal thereof. The seventh transistor 304 receives the inverted second clock signal $V_{INV\_CLK\_2}$ at logic high state at the gate terminal thereof and hence, the seventh transistor 304 is switched OFF. The ninth transistor 308 receives the third intermediate signal $V_{INT\_3}$ at logic high state at its gate terminal and hence, the ninth transistor 308 is switched ON, thereby generating the second control signal $V_{CONTROL\_2}$ at logic low state. The tenth transistor 310 receives the second control signal $V_{CONTROL\_2}$ at logic low state at its gate terminal and hence, the tenth transistor 310 is switched ON. Thus, the tenth transistor 310 generates the fourth intermediate signal $V_{INT\_4}$ at logic high state, thereby charging the first terminal of the second capacitor 314 at a voltage level corresponding to logic high state.

When the second input clock signal $V_{INPUT\_CLK\_2}$ transitions from logic low state to logic high state, the second clock signal $V_{CLK\_2}$ transitions from low to high and the inverted second clock signal $V_{INV\_CLK\_2}$ transitions from high to low. The sixth transistor 302 receives the second clock signal $V_{CLK\_2}$ at logic high state at its gate terminal and hence, the sixth transistor 302 is switched OFF. The seventh transistor 304 receives the inverted second clock signal $V_{INV\_CLK\_2}$ at logic low state at its gate terminal and hence, the seventh transistor 304 is switched ON. This leads to a flow of current from the first terminal of the second capacitor 314 to ground by way of the tenth transistor 310 and the seventh through ninth transistors 304-308. Hence, the first terminal of the second capacitor 314 is discharged to a fourth voltage level.

Meanwhile, the second delay circuit 316 receives the inverted second clock signal $V_{INV\_CLK\_2}$ at logic low state and generates the intermediate delayed inverted second clock signal $V_{INT\_DEL\_INV\_CLK\_2}$ at logic low state after the second predetermined time period. The second set of inverters 330 generates the delayed inverted second clock signal $V_{DEL\_INV\_CLK\_2}$ at logic low state, thereby discharging the second terminal of the second capacitor 314 to a voltage level corresponding to logic low state. In one embodiment, the voltage level corresponding to logic low state is 0V. Thus, the voltage level of the second output voltage $V_{OUT\_2}$ drops below 0V and is approximately equal to the difference of the fourth voltage level and the voltage level corresponding to logic high state. In another embodiment, the voltage level corresponding to logic high state is $V_{DD\_2}$. Thus, the second charge pump 300 provides negative charge pump action.

Further, current flowing from the first terminal of the second capacitor 314 to ground by way of the tenth transistor 310 and the seventh through ninth transistors 304-308 can be varied by varying a size of the eighth transistor 306. Thus, the voltage level of the second output voltage $V_{OUT\_2}$ is controllable by varying the size of the eighth transistor 306. Therefore, the second charge pump 300 allows a designer to adjust the voltage level of the second output voltage $V_{OUT\_2}$ by varying the size of the eighth transistor 306 when designing the second charge pump 300.

The second charge pump 300 can operate efficiently with a small size of the second capacitor 314, thereby reducing an area of the second charge pump 300. Further, charge leakage is less, thereby reducing a refresh rate of the second capacitor 314.

It will be understood by those of skill in the art that the voltage level of the second output voltage $V_{OUT\_2}$ can be controlled by varying a size of the eighth transistor 306 or the ninth transistor 308 or a combination thereof. It will be further understood by those of skill in the art that voltage level of the second output voltage $V_{OUT\_2}$ can be controlled by varying the number of inverters in at least one of the second delay circuit 316 and the second set of inverters 330. It will be further understood by those of skill in the art that the second charge pump 300 can function even without the tenth and eleventh inverters 324 and 326.

It will be understood by those of skill in the art that source and drain terminals of a PMOS transistor or an NMOS transistor are interchangeable depending upon the direction of current flowing through the transistor.

A single capacitor charge pump circuit has been disclosed. The charge pump circuit has the following advantages: (i) it has reduced refresh rate requirement as charge leaks through only one low area device, (ii) it takes up less area with respect to traditional two capacitor designs, (iii) it is a controlled output architecture, (iv) the architecture does not require any high voltage devices, and (v) both positive and negative types of charge pumps can be achieved using the architecture.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A charge pump, comprising:
a control circuit for receiving a clock signal and an inverted version of the clock signal and generating a control signal and a first intermediate signal, wherein the control circuit comprises:
  a first transistor having a first terminal for receiving a supply voltage and a gate terminal for receiving the first intermediate signal;
  a second transistor having a gate terminal connected to a first terminal thereof and a second terminal connected to the second terminal of the first transistor for generating the control signal;
  a third transistor having a gate terminal for receiving the clock signal and a first terminal connected to the first terminal of the second transistor; and
  a fourth transistor having a gate terminal for receiving the inverted version of the clock signal, a first terminal connected to ground, and a second terminal connected to a second terminal of the third transistor for generating the first intermediate signal;
a fifth transistor having a gate terminal connected to the control circuit for receiving the control signal, a first terminal connected to the control circuit for receiving the first intermediate signal, and a second terminal for generating a second intermediate signal; and
a capacitor having a first terminal connected to the second terminal of the fifth transistor for receiving the second intermediate signal and a second terminal for receiving a delayed version of the clock signal, wherein the capacitor generates an output voltage at the first terminal thereof.

2. The charge pump of claim 1, wherein a size of the second transistor controls a voltage level of the output voltage.

3. The charge pump of claim 1, further comprising:
a delay circuit for receiving the inverted version of the clock signal and generating a delayed inverted version of the clock signal; and
a first set of inverters connected to the delay circuit for receiving the delayed inverted version of the clock signal and generating the delayed version of the clock signal.

4. The charge pump of claim 3, wherein the delay circuit includes a second set of inverters.

5. The charge pump of claim 3, wherein the delay circuit is a skewed delay circuit, and wherein a falling time of the delayed inverted version of the clock signal is less than a rising time of the delayed inverted version of the clock signal.

6. The charge pump of claim 1, wherein the first and second transistors are p-channel metal-oxide semiconductor (PMOS) transistors, and the third, fourth, and fifth transistors are n-channel metal-oxide semiconductor (NMOS) transistors.

7. A charge pump, comprising:
a control circuit for receiving a clock signal and an inverted version of the clock signal and generating a control signal and a first intermediate signal, wherein the control circuit comprises:
  a first transistor having a first terminal for receiving a supply voltage and a gate terminal for receiving the clock signal;
  a second transistor having a gate terminal for receiving the inverted version of the clock signal and a first terminal connected to a second terminal of the first transistor for generating the first intermediate signal;
  a third transistor having a gate terminal connected to a first terminal thereof and a second terminal of the second transistor; and
  a fourth transistor having a gate terminal connected to the second terminal of the first transistor for receiving the first intermediate signal, a first terminal connected to ground, and a second terminal connected to a second terminal of the third transistor for generating the control signal;
a fifth transistor having a first terminal connected to the control circuit for receiving the first intermediate signal, a gate terminal connected to the control circuit for receiving the control signal, and a second terminal for generating a second intermediate signal; and
a capacitor having a first terminal connected to the second terminal of the fifth transistor for receiving the second intermediate signal and a second terminal for receiving a delayed inverted version of the clock signal, wherein the capacitor generates an output voltage at the first terminal thereof.

8. The charge pump of claim 7, wherein a size of the third transistor controls a voltage level of the output voltage.

9. The charge pump of claim 7, further comprising:
a delay circuit for receiving the inverted version of the clock signal and generating an intermediate delayed inverted version of the clock signal; and
a first set of inverters connected to the delay circuit for receiving the intermediate delayed inverted version of the clock signal and generating the delayed inverted version of the clock signal.

10. The charge pump of claim 9, wherein the delay circuit further comprises a second set of inverters.

11. The charge pump of claim 9, wherein the delay circuit is a skewed delay circuit, and wherein a falling time of the intermediate delayed inverted version of the clock signal is less than a rising time of the intermediate delayed inverted version of the clock signal.

12. The charge pump of claim 7, wherein the first, second, and fifth transistors are p-channel metal-oxide semiconductor (PMOS) transistors, and the third and fourth transistors are n-channel metal-oxide semiconductor (NMOS) transistors.

* * * * *